United States Patent
Adey et al.

[11] Patent Number: 5,946,851
[45] Date of Patent: Sep. 7, 1999

[54] WEED KILLING METHOD AND APPARATUS

[76] Inventors: Darren C. Adey, 6 Bluehills Avenue, Nunawading, Australia, NIC 3131; Brian M. Sutcliffe, 6B Norton Park Avenue, Lower Hutt 6009; John P. Fahey, 10 Houhere Terrace, Eastborne 6008, both of New Zealand

[21] Appl. No.: 08/776,338

[22] PCT Filed: Jul. 19, 1995

[86] PCT No.: PCT/NZ95/00063

§ 371 Date: Jun. 20, 1997

§ 102(e) Date: Jun. 20, 1997

[87] PCT Pub. No.: WO96/03036

PCT Pub. Date: Feb. 8, 1996

[30] Foreign Application Priority Data

Jul. 28, 1994 [AU] Australia ................................ PM 7096
Feb. 2, 1995 [AU] Australia ................................ PN 0913

[51] Int. Cl.⁶ ................................................ A01M 21/00
[52] U.S. Cl. .................................. 47/1.5; 47/1.7; 47/48.5
[58] Field of Search .............................. 47/1.5, 1.7, 48.5, 47/58; 239/13, 135

[56] References Cited

U.S. PATENT DOCUMENTS

| | | |
|---|---|---|
| 3,599,866 | 8/1971 | Bolton . |
| 4,208,835 | 6/1980 | Roll et al. ................................... 47/4.5 |
| 4,305,224 | 12/1981 | Maddock .................................. 47/4.5 |
| 5,050,340 | 9/1991 | Seifert ..................................... 47/48.5 |
| 5,251,818 | 10/1993 | Manor et al. ........................... 47/1.7 X |
| 5,297,730 | 3/1994 | Thompson ................................ 239/13 |
| 5,319,878 | 6/1994 | Moffett et al. . |
| 5,430,970 | 7/1995 | Thompson et al. ....................... 47/1.5 |
| 5,433,758 | 7/1995 | Thompson et al. ........................ 47/58 |
| 5,469,653 | 11/1995 | Roehrick .................................... 47/1.7 |
| 5,527,366 | 6/1996 | Mazurkiewicz ........................ 47/1.5 X |
| 5,547,128 | 8/1996 | Scheffler ................................ 47/1.5 X |
| 5,575,111 | 11/1996 | Rajamannan ........................... 47/1.5 X |

FOREIGN PATENT DOCUMENTS

| | | |
|---|---|---|
| 10256/83 | 7/1983 | Australia . |
| 60887/90 | 2/1991 | Australia . |
| 437892 | 7/1991 | European Pat. Off. . |
| 3639705 | 11/1986 | Germany . |
| 3639705 | 6/1988 | Germany . |
| 3727291 | 3/1989 | Germany . |
| 4039359 | 12/1990 | Germany . |
| 3922002 | 1/1991 | Germany . |
| 4039359 | 6/1992 | Germany . |
| 4100221 | 7/1992 | Germany . |
| 202990 | 2/1987 | New Zealand . |
| 240568 | 12/1994 | New Zealand . |
| 7803451 | 10/1977 | South Africa . |
| 976916 | 12/1982 | U.S.S.R. . |
| WO 91/14363 | 10/1991 | WIPO . |
| 96-257771 | 12/1994 | WIPO . |

*Primary Examiner*—Jack W. Lavinder
*Assistant Examiner*—Yvonne Abbott
*Attorney, Agent, or Firm*—Andrus, Sceales, Starke & Sawall

[57] ABSTRACT

A weed killing apparatus comprises a hollow chamber (1) having an air inlet and an open end forming a hot air outlet (4), an apparatus which blows air through the chamber to exit the open end thereof, heater (5) in the chamber (1) for heating the air passing through the chamber so that the air exits the outlet (4) end of the chamber (1) as a blast of heated air, and means for introducing moisture (21) into the air flow to mix with the blast of heated air. The foliage of weeds is surface wetted and heated which kills the weeds.

15 Claims, 4 Drawing Sheets

WEED KILLING METHOD AND APPARATUS

FIELD OF INVENTION

The invention comprises a weed killing method and apparatus.

BACKGROUND

Conventionally weeds are controlled by pulling out the weeds or by use of chemical sprays. Chemical sprays are extensively used in various areas and applications. For example chemical sprays are frequently used by municipal bodies such as city councils for controlling weeds along road sides, and in public areas such as parks and sports grounds and so forth. There is a growing awareness however of the side effects which may arise from use of chemical sprays.

The invention provides an improved or at least alternative form of weed killing method and apparatus.

In broad terms in one aspect the invention comprises
 a hollow chamber having an air inlet and an open end forming a hot air outlet,
 means for passing air through the chamber to exit the open end thereof at a volume flow rate of at least 600 litres/minute, and
 heating means in the chamber for heating the air passing through the chamber so that the air exits the outlet end of the chamber as a blast of heated air.

In broad terms in another aspect the invention comprises a method of killing or controlling weeds comprising blowing onto the weeds hot air containing or mixed with sufficient moisture to wet the foliage of the weeds.

By "wet" is meant that the previously dry foliage of the weeds becomes wetted with water visible to the naked eye.

In broad terms in a further aspect the invention comprises a weed killing apparatus comprising
 a hollow chamber having an air inlet and an open end forming a hot air outlet,
 means for blowing air through the chamber to exit the open end thereof,
 heating means in the chamber for heating the air passing through the chamber so that the air exits the outlet end of the chamber as a blast of heated air, and
 means for introducing moisture into the air flow to mix with the blast of heated air.

The moisture may be introduced into the airflow as a spray of free water which mixes with and is heated by the hot air blast. The hot water spray/air mixture may also contain steam if the water becomes heated sufficiently. A stream of water may be injected from a nozzle for example, into the chamber near the air inlet or intermediate along the length of the chamber, and be heated sufficiently to exit the apparatus outlet as a mist of hot water or high humidity air. Alternatively the moisture may be introduced into the air flow as a fine mist of water droplets which is heated by the hot air flow and/or heating means within the chamber so that the moisture exits the outlet of the apparatus as a mist of hot water or steam mixed with the air flow, or alternatively as predominantly hot water vapour or steam or high humidity air.

Alternatively the moisture may be introduced into the airflow as a spray of free water in sufficient quantity that a proportion of the water exits the outlet of the apparatus as substantially cool or low heated water. The cool or low heated water is deposited on the foliage of the weed and is then heated or further heated by the hot air stream. The water initially prevents burning or flaming of the weeds foliage and, following heating, results in a residual heat mass being present on the foliage. Alternatively a spray of free water may be introduced into the air flow from a water outlet such as a nozzle positioned immediately beyond the hot air outlet of the apparatus to mix with the heated air leaving the hot air outlet.

It has been found that in use the moisture wets the foliage of the weeds which are simultaneously heated by the hot air blast. A saline solution may be added to the water, steam or moisture, and high humidity air tends to condense onto the foliage to wet the weeds. Wetting of the weeds foliage inhibits burning or flaming which could otherwise occur from a blast of hot air once the weed has initially dried out after being subjected to the hot air, and can increase the speed of kill relative to the use of hot air alone. The rate of decay of the dead weeds over days or weeks subsequently may also be increased relative to hot air alone.

Preferably the flow rate of air through the chamber is at least 600 litres/minute, more preferably 800 litres/minute, and most preferably in the range 1000 to 5000 litres/minute.

Preferably the air is heated such that it exits the outlet end of the apparatus at a temperature in the range of about 100° C. to 900° C. and most preferably in the range 450° C. to 650° C.

Preferably the means for passing air through the chamber comprises a compressed air inlet for releasing compressed air into the chamber. Preferably the compressed air supplied to the compressed air outlet is at a pressure in the range 0.5 to 10 bar and most preferably 4 to 5 bar immediately prior to the compressed air outlet, which is of a size 0.5 to 1.5 mm in diameter and most preferably 0.9 to 1.3 mm in diameter. Where other sizes of compressed air outlet are used, preferably the air is at a pressure which creates an airflow exiting the outlet equivalent to that created by air at a pressure in the range 0.5 to 10 bar and most preferably 4 to 5 bar passing through an outlet of 0.5 to 1.5 mm diameter and preferably 0.9 to 1.3 mm diameter.

It is preferred that the air flow through the chamber is provided from a source of compressed air over compressed air hoses, but alternatively air flow could be provided by an electric fan or similar of a suitable capacity to provide the required air flow. Air supply from a compressed air source is preferred because the air source such as the compressor can then be distantly located from the operator but connected to the operator over relatively small diameter pipes or hoses which are easily moved about by the operator when using the apparatus.

Preferably the flow rate of water into the chamber is at least one half to one litre per minute, but the input flow rate of water will depend on the desired water content of the air exiting the outlet and/or to be applied to the weeds. Where sufficient water is mixed with the air so that a spray of hot water optionally including some steam exits the outlet mixed with the hot air, the input flow rate may be well in excess of 1 litre per minute such as 2.5 litres/minute or more. Where only a fine mist of hot water or steam is to exit the outlet with the hot air, then the input flow rate of water may be less than 1 litre per minute, particularly so where the least water is used and the apparatus applies high humidity air to the weeds such as air having a relative humidity in the range 80% to 98% for example. When the flow rate of the water is such that a proportion of cool or low heated water exits the apparatus, the amount of water being injected into the hot air stream will be increased. For example 0.5 litre/minute of water in a hot air stream of 100 litres/minute has been found to be suitable. Where saline solution is added the most preferable range is 1–20% by weight.

The means for introducing water/moisture into the air flow may comprise one or more water nozzles within the heating chamber or beyond the hot air outlet of the chamber which spray water into the air flow as a spray or fine mist. Alternatively one or more nozzles may be arranged to spray water onto the side wall of the chamber or onto a heating element in the chamber arranged to heat the water to the desired temperature. Alternatively again the water may be introduced into the air line so that it is sprayed out of the air inlet with the air.

Preferably the air heating means is a gas fired heating means, which preferably comprises at least one gas burner outlet in the chamber to heat the air exiting from the compressed air outlet. Most preferably the heating means comprises four gas burner outlets positioned around the interior of the chamber to form a ring of gas burners and the compressed air outlet is arranged to release the compressed air through the middle of the ring of burners to most effectively heat the compressed air.

Preferably the apparatus is arranged to be manually operated and comprises a handle at or near the other end of the apparatus by which a user may move and manipulate the apparatus and ground contacting means such as wheels or skids for example, at the outlet end of the chamber. The wheels or skids are to maintain the hot air/water outlet at a fixed distance from the ground when the apparatus is rolled along the ground over weeds to be eradicated. Preferably the outlet end of the apparatus includes a shroud surrounding the outlet aperture to prolong the contact of the hot air and moisture with the weeds before escaping to the ambient environment, to increase the wetting of the weeds foliage in particular. Alternatively the apparatus of the invention could be vehicle mounted, by mounting one or more hot air chambers across the front of the vehicle or along the sides of the vehicle, or on an arm articulated from the vehicle, for example.

In a commercial weed killing apparatus of the invention a gas tank, water tank and air compressor may be mounted on the back of a vehicle such as a truck and connected to the apparatus by gas and compressed air hoses, so that the weed killing apparatus may be used within a radius of for example 50 metres or so from the vehicle. Alternatively in a smaller apparatus such as a domestic apparatus the gas, water and compressed air may be supplied from smaller gas, water and compressed air bottles for example.

In another aspect the invention comprises a method of weed killing, comprising subjecting the weeds to moisture mixed with a flow of compressed air from an outlet for the compressed air of a diameter in the range 0.5 to 1.5 mm and most preferably 0.9 to 1.3 mm, with an air pressure behind the outlet in the range 0.5 to 10 bar and most preferably 4 to 5 bar, or to an airflow equivalent thereto, heating the air exiting the outlet to a temperature in the range 100 to 900° C. and most preferably in the range 450 to 650° C.

To further illustrate the invention a preferred form weed killing apparatus of the invention which is truck based is described with reference to the accompanying drawings by way of example and without intending to be limiting, wherein.

Figure 1:
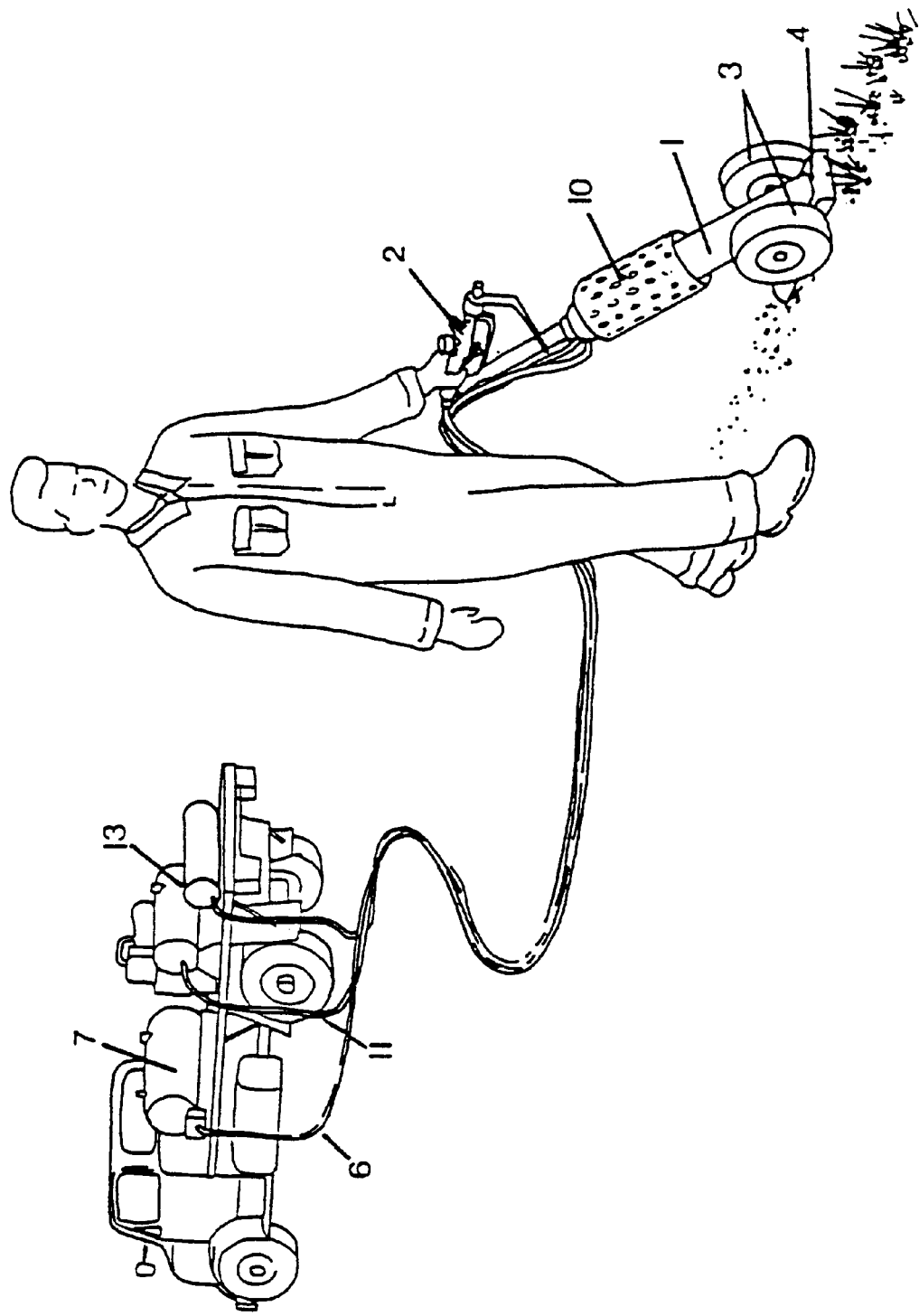
FIG. 1 shows the preferred form apparatus in use.

Referring to the drawings, the preferred form apparatus all comprise a metal cylinder 1, the interior of which forms the hollow chamber of the apparatus in which the air is heated.

At one end the apparatus also comprises a handle 2 and at the other end ground wheels 3 which in use as shown in FIG. 1 maintain the outlet 4 of the chamber spaced a set distance from the ground. Suitably the distance between the outlet of the apparatus and the ground is about 40 to 75 mm. The outlet 4 may be surrounded by a shroud 4a which extends rearwardly as shown, which will prolong contact by weeds over which the outlet passes with the hot air and water or moisture wetting the weeds. The gap between the shroud 4a and the ground may be larger at the rear to allow escape of air mainly to the rear. By way of example, in the preferred form apparatus the metal cylinder 1 is approximately 500 mm in length and 90 mm in diameter. It is not necessary that the cylinder 1 be of circular cross-section as it could alternatively be of rectangular cross-section so as to kill a strip of weeds as it moves.

Four gas burner outlets 5 are provided at the end of the chamber 1 opposite the open end 4. In use of the apparatus the gas burner outlets 5 create a flame at the upper end of the chamber as shown. The gas burner outlets 5 are supplied with gas such as LPG or propane or similar over a gas supply line 6 from for example a truck mounted gas tank 7 as shown in FIG. 1. The gas supply line 6 connects to the handle 2 and the gas passes through the interior of the handle and through conduit 7 to the gas burners 5.

The handle 2 incorporates a trigger switch 8 which controls the gas, air and water flow, and a gas adjustor 9 and optionally also a water flow adjustor (not shown). An operator can turn the gas, air and water flow on or off using the trigger switch 8 as the operator rolls the apparatus over weeds. The adjustor 9 adjusts the size of the gas flame in the chamber at the on position of the trigger switch. When the trigger 8 is released so that the gas and air flow is "off", either a small amount of gas is still allowed to flow to the gas burners 5 to maintain effectively a pilot flame, so that when the trigger is again pulled the gas will immediately ignite or alternatively the trigger may also activate a piezo electric spark starter to relight the gas flow. Instead of being actuated by the trigger such a piezo starter may be actuated by a separate button or trigger. The primary air source for combustion at the gas burners is ambient air which can pass through a heat shield 10 around the top end of the cylinder 1, and into the chamber through holes formed in the top part of the cylinder.

A compressed air line 11 supplies a flow of compressed air to a compressed air inlet 12 at the top of the chamber 1 as shown. The compressed air flow is also controlled by the trigger 8 but with a slight delay, of for example five seconds or so, so that when the trigger 8 is pulled to "light" the burners 5 to a maximum, after a short delay to allow the burners to light, compressed air will also flow from the inlet 12. The air will flow through the flames from the burners 5 so that the high pressure air entering the top end of the chamber from the compressed air inlet 12 and flowing through the chamber 1 is heated, to for example of the order of 450 to 650° C. Thus the air flow exiting the outlet 4 of the apparatus mixed with or containing the moisture is an extremely hot blast of air.

Figure 2:
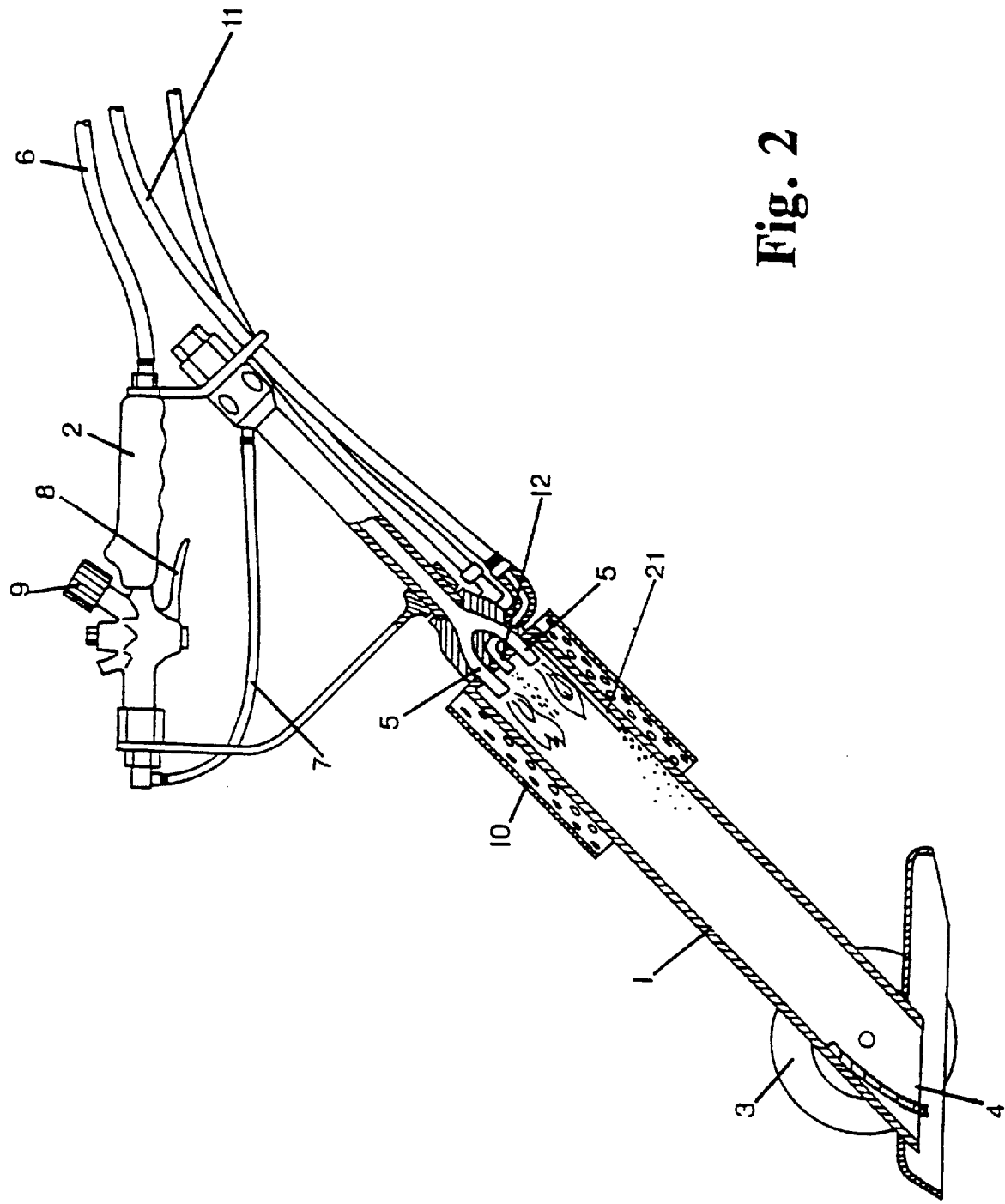
FIG. 2 is a cross-sectional view through one preferred form of apparatus of the invention.

In the apparatus shown in FIG. 2 a water line 20 supplies a flow of water to a water outlet pipe 21 at the top of the chamber as shown. The outlet 21 may comprise a nozzle which injects a spray of water into the hot air immediately past the gas burners 5 at the top of the chamber, either as a fine mist or as a spray of larger water droplets. Alternatively, the outlet may release a light flow of water into the top of the chamber as shown which contacts or runs down the chamber wall so as to be heated by the chamber wall to be taken up by the air to increase the humidity of the air, or to be heated to steam or a mixture of steam and water exiting the outlet 4. A number of water outlets may surround the gas burners 5. It is also possible that the water may enter the chamber through the compressed air inlet 12 along with the compressed air.

Figure 3:
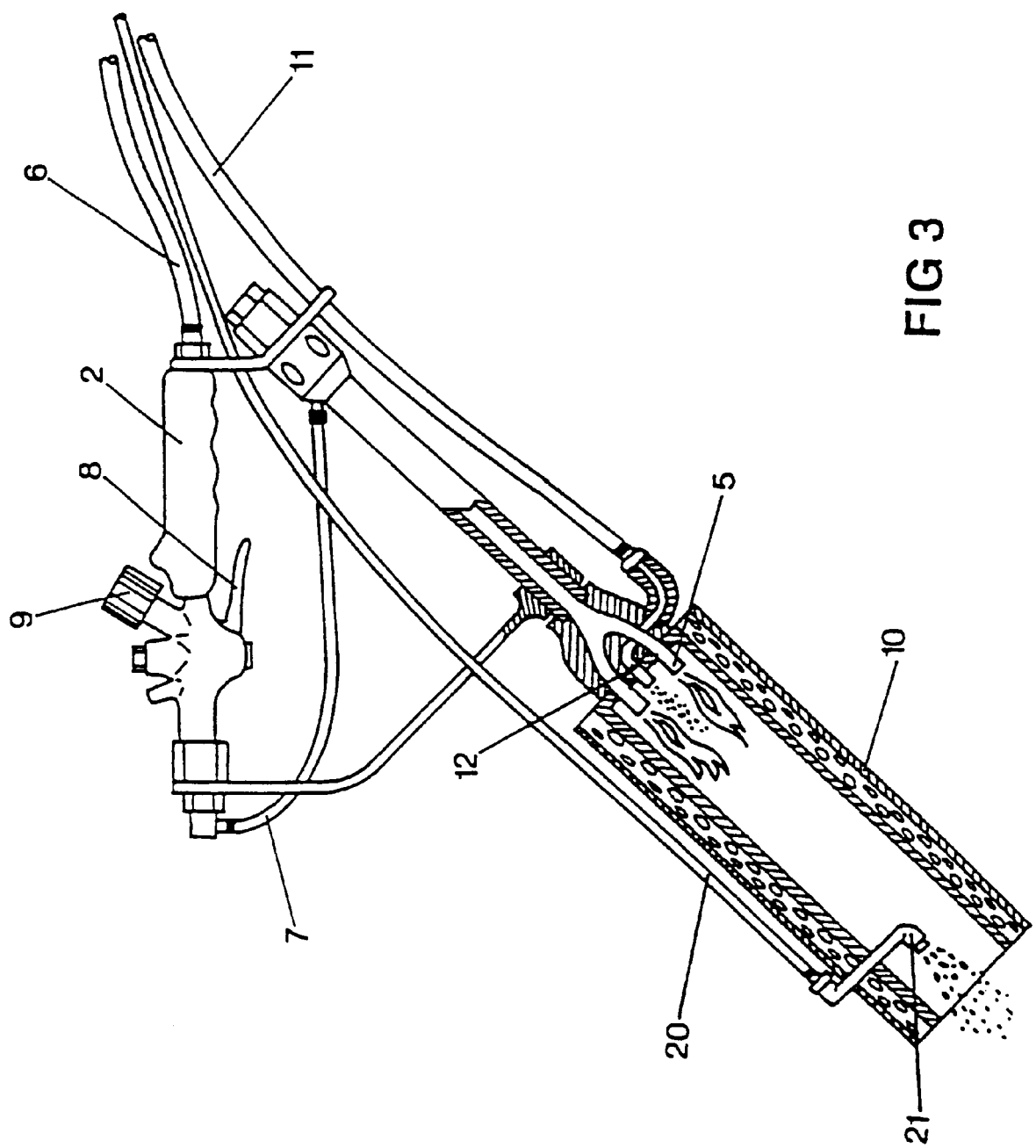
FIG. 3 is a cross-sectional view through a second preferred form of apparatus of the invention.
Figure 4:
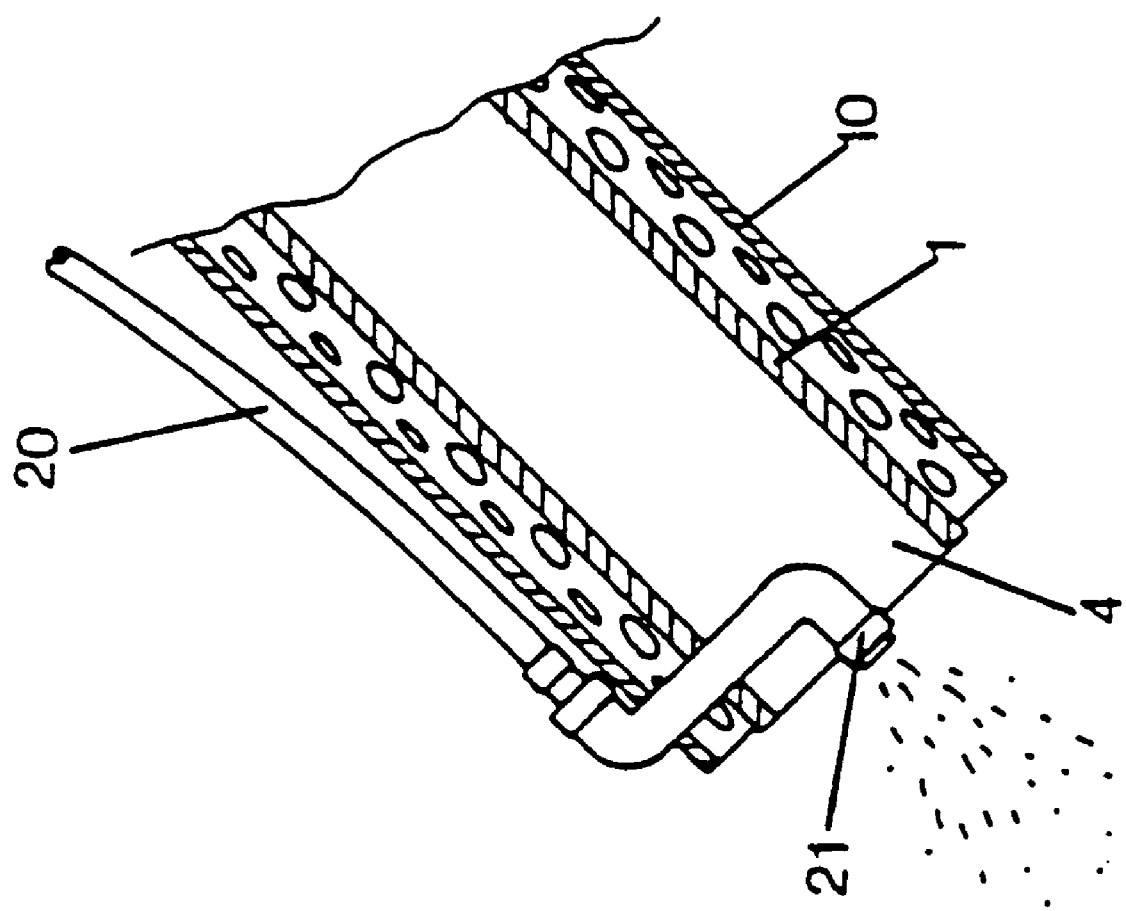
FIG. 4 is close up cross-sectional view of another preferred form of apparatus of the invention.

In the apparatus shown in FIG. 3, a water line 20 supplies a flow of water to a water outlet pipe 21 at the bottom of the chamber as shown, near to the hot air outlet. The water outlet 21 may again comprise a nozzle which injects a spray of water into the hot air exiting the chamber, either as a fine mist or as a spray of larger droplets. FIG. 4 shows a slight variation to the version of FIG. 3, where in FIG. 4 the water outlet nozzle 21 is positioned immediately past the hot air outlet of the chamber. In the forms of FIGS. 3 and 4 the water will be less heated than in the form of FIG. 2. In the FIGS. 3 and 4 versions water may exit the nozzle 21 in sufficient quantity that all or a proportion of the water is deposited on the foliage of the weeds as cool or low heated water to prevent burning or flaming of the weeds foliage as referred to previously.

The water flow is also controlled by the trigger 8 but preferably with a slight delay, of, for example, 7 seconds or so, so that when the trigger 8 is pulled to light the burners 5 to a maximum, after a short delay to allow the burners to light and compressed air to subsequently begin to flow from the air inlet 12, water will begin to be sprayed from the water outlet 21 in each case.

The trigger 8 may incorporate a releasable lock so that it can be locked in the on position so that an operators hand does not tire in use from holding the trigger on over long periods of use.

The delay between the trigger initiating the gas flow and then the air flow and water flow may be provided for by the flow in the gas line activating a gas line flow sensor which in turn energises solenoid valves to turn on the air and then the water flows. Alternatively the delay could be provided for by an electronic delay timer controlling the air and water flow valves.

In the preferred form of the apparatus which is truck based as shown in FIG. 1, compressed air is supplied from a compressor 13 mounted on the back of the truck as shown. Water is supplied from a water tank 23.

In other versions of the apparatus the water outlet 21 and water line 20 and water control are omitted, so that the apparatus directs simply a blast of heated air onto the weeds, at a flow rate of at least 600 litres/minute to kill the weeds.

Other versions of apparatus of the invention are possible. For example, the chamber 1 could be rectangular in cross-section with a number of gas burner and air outlets spaced across the width of the upper end of the chamber. In another form a weed killer could have multiple cylinders 1 ganged together. In another form of apparatus the operator may carry a gas and water and compressed air supply tank on his back for example.

In the preferred form apparatus described above air is supplied from a compressor over an air hose to the compressed air outlet to cause the air flow through the chamber, but in an alternative form a large fan could be mounted on the truck which supplies air over a large diameter pipe to the apparatus such as a pipe of approximately 100 mm diameter for example. The apparatus of the invention with a compressed air outlet and compressed air source has the advantage that only small hoses are required between the truck or equivalent and the apparatus used by the operator which hoses are easier and more convenient to move about in use as the operator works.

In the preferred form described the heating means comprises gas burners as described but alternatively a high temperature electric heating element extending around the top end of the interior of the cylinder 1 could be used.

The foregoing describes the invention including a preferred form thereof. Alterations and modifications as will be obvious to those skilled in the art are intended to be incorporated within the scope hereof.

We claim:

1. A weed killing apparatus comprising:
    a hollow chamber having an air inlet and an open end forming a hot air outlet,
    means for blowing air through the chamber to exit the open end thereof,
    heating means in the chamber for heating the air passing through the chamber so that the air exists the outlet end of the chamber as a blast of heated air, and
    means for introducing water into the air flow to exit the outlet of the apparatus as a mist or spray of water droplets directed at the weeds so that the foliage of the weeds is wetted by the mist or spray of free water and simultaneously heated by the blast of heated air.

2. A weed killing apparatus according to claim 1, wherein the flow rate of air through the chamber is at least 600 litres/minute.

3. A weed killing apparatus according to claim 1, wherein the flow rate of air through the chamber is in the range 1000 to 5000 litres/minute.

4. A weed killing apparatus according to claim 1, wherein the air is heated such that it exits the outlet end of the apparatus at a temperature in the range of about 100° C. to 900° C.

5. A weed killing apparatus according to claim 1, wherein the air is heated such that it exits the outlet end of the apparatus at a temperature in the range 450° C. to 650° C.

6. A weed killing apparatus according to claim 1, wherein the means for passing air through the chamber comprises a compressed air inlet for releasing compressed air into the chamber.

7. A weed killing apparatus according to claim 6, wherein the air is at a pressure which creates an airflow exiting the outlet equivalent to that created by air at a pressure in the range 0.5 to 10 bar passing through an outlet of 0.5 to 1.5 mm diameter.

8. A weed killing apparatus according to claim 1, wherein the flow rate of water into the chamber is at least one half to one litre per minute.

9. A weed killing apparatus according to claim 1, wherein the input flow rate of water is less than 1 litre per minute.

10. A weed killing apparatus according to claim 1, wherein the means for introducing water into the air flow comprises one or more water nozzles which spray water into the air flow.

11. A weed killing apparatus according to claim 1, wherein the air heating means is a gas fired heating means comprising at least one gas burner outlet in the chamber to heat the air exiting from the compressed air outlet.

12. A weed killing apparatus according to claim 1, wherein the apparatus is arranged to be manually operated and comprises a handle by which a user may move and manipulate the apparatus.

13. A weed killing apparatus according to claim 12, wherein the outlet end of the apparatus includes a shroud surrounding the outlet end to prolong the contact of the hot air and water with the weeds and increase wetting of the weeds.

14. A weed killing apparatus according to claim 12 also comprising a gas tank, water tank and air compressor mounted on a vehicle and connected to the apparatus by gas and air hoses.

15. A method of killing or controlling weeds comprising blowing onto the weeds hot air and a mist or spray of water droplets directed at the weeds, so that previously dry foliage of the weeds becomes wetted by the mist or spray of free water with water visible to the naked eye and is simultaneously heated by the hot air.

* * * * *